US008289686B2

(12) United States Patent
Yang et al.

(10) Patent No.: US 8,289,686 B2
(45) Date of Patent: Oct. 16, 2012

(54) PORTABLE COMPUTING DEVICE HAVING DISPLAY POSITIONING MECHANISM

(75) Inventors: Xin Yang, Shenzhen (CN); Wei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 277 days.

(21) Appl. No.: 12/796,637

(22) Filed: Jun. 8, 2010

(65) Prior Publication Data

US 2011/0043991 A1    Feb. 24, 2011

(30) Foreign Application Priority Data

Aug. 19, 2009    (CN) .......................... 2009 1 0305815

(51) Int. Cl.
*G06F 1/16* (2006.01)
*H05K 5/00* (2006.01)
*H05K 7/00* (2006.01)

(52) U.S. Cl. ................. 361/679.27; 361/679.55; 16/303
(58) Field of Classification Search .. 361/679.26–679.3, 361/679.55, 679.56, 679.58; 16/235, 239, 16/250, 303, 330, 341
See application file for complete search history.

(56) References Cited

U.S. PATENT DOCUMENTS

| | | | | |
|---|---|---|---|---|
| 7,117,562 B2* | 10/2006 | Zuo et al. | ......................... | 16/303 |
| 7,140,071 B2* | 11/2006 | Tonogai | ........................... | 16/325 |
| 7,489,507 B2* | 2/2009 | Karashima et al. | ...... | 361/679.28 |
| 7,647,674 B2* | 1/2010 | Duan et al. | ....................... | 16/330 |
| 7,963,000 B2* | 6/2011 | Lai et al. | .......................... | 16/367 |
| 8,006,346 B2* | 8/2011 | Zhang et al. | ..................... | 16/303 |
| 8,081,439 B2* | 12/2011 | Karashima et al. | ...... | 361/679.27 |
| 2003/0153284 A1* | 8/2003 | Minami et al. | ................... | 455/90 |
| 2004/0244146 A1* | 12/2004 | Park | ............................... | 16/239 |
| 2006/0242795 A1* | 11/2006 | Duan et al. | ....................... | 16/330 |
| 2006/0242796 A1* | 11/2006 | Duan et al. | ....................... | 16/330 |
| 2006/0254026 A1* | 11/2006 | Duan et al. | ....................... | 16/330 |
| 2008/0034541 A1* | 2/2008 | Duan et al. | ....................... | 16/330 |
| 2009/0040694 A1* | 2/2009 | Karashima et al. | ...... | 361/679.27 |
| 2009/0040707 A1* | 2/2009 | Karashima et al. | ........... | 361/681 |
| 2009/0244012 A1* | 10/2009 | Behar et al. | ..................... | 345/169 |
| 2009/0244832 A1* | 10/2009 | Behar et al. | ............. | 361/679.55 |
| 2009/0320241 A1* | 12/2009 | Lazert et al. | .................... | 16/239 |
| 2010/0050384 A1* | 3/2010 | Zhang et al. | .................... | 16/303 |

* cited by examiner

*Primary Examiner* — Adrian S Wilson
(74) *Attorney, Agent, or Firm* — Altis Law Group, Inc.

(57) ABSTRACT

A portable computing device includes a base and a display rotatably connected to the base. A display positioning mechanism includes a first sleeve that is fixed to the display and includes a first end wall defining a first through bore and a plurality of first positioning holes extending therethrough. The positioning mechanism also includes a second sleeve fixed to the base and including a second end wall defining a second through bore and a second positioning hole. The positioning mechanism further includes a button slidably that is received in the first sleeve and the second sleeve and includes a rod, a first annular plate, and a second annular plate. The rod extends through the first through bore and the second bore. The first annular plate and the second annular plate are spaced from each other and extend radially outward from the rod. The first annular plate includes a first post.

13 Claims, 5 Drawing Sheets

PORTABLE COMPUTING DEVICE HAVING DISPLAY POSITIONING MECHANISM

BACKGROUND

1. Technical Field

The present disclosure relates to portable computing devices and, more particularly, to a portable, foldable computing device including a positioning structure to set a display in a desired orientation relative to a base.

2. Description of Related Art

A portable computing device such as a notebook computer generally includes a frictional hinge to position the display. After repeated opening and closing of the display, the frictional hinge may no longer provide sufficient friction to maintain the positioning ability. It is desirable to provide a portable computing device having a display positioning mechanism to overcome the aforementioned problem.

BRIEF DESCRIPTION OF THE DRAWINGS

The components in the drawings are not necessarily drawn to scale, the emphasis instead being placed upon clearly illustrating the principles of the portable computing device having a display positioning mechanism. Moreover, in the drawings, like reference numerals designate corresponding parts throughout the several views.

DETAILED DESCRIPTION

Figure 1:
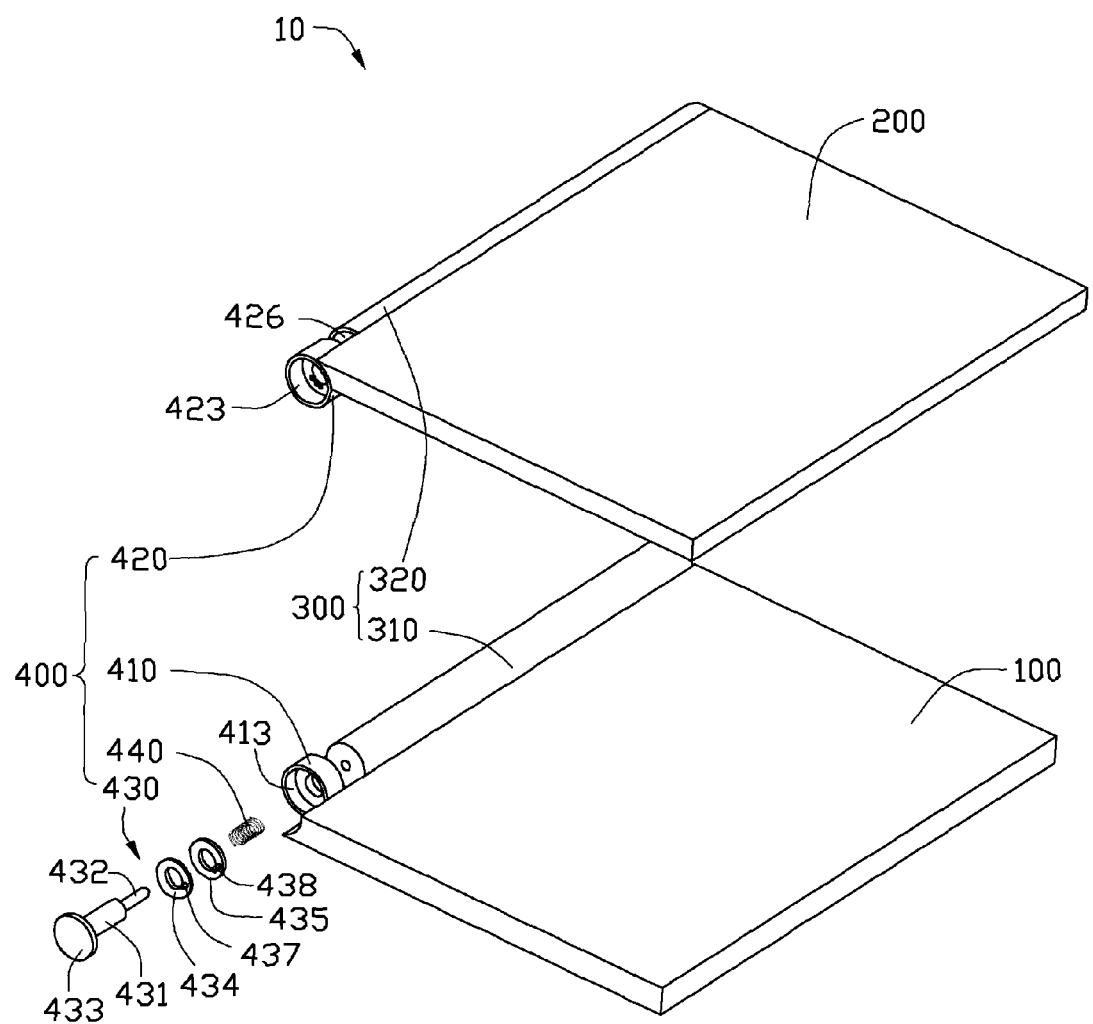
FIG. 1 is an isometric, exploded view of a portable computing device in accordance with an exemplary embodiment.

Embodiments of the present disclosure will now be described in detail below, with reference to the accompanying drawings. Referring to FIG. 1, a portable computing device 10 includes a base 100, a display 200, and a hinge 300. The hinge 300 includes an axle 310 fixed to a back end of the base 100, and an axle receiver 320 fixed to the display 200. The display 200 is rotatably connected to the base 100 via the hinge 300. The computing device 10 can be any foldable device that includes a base and a rotary member pivotably connected to the base. In the embodiment, the computing device 10 is a laptop computer.

Figure 2:
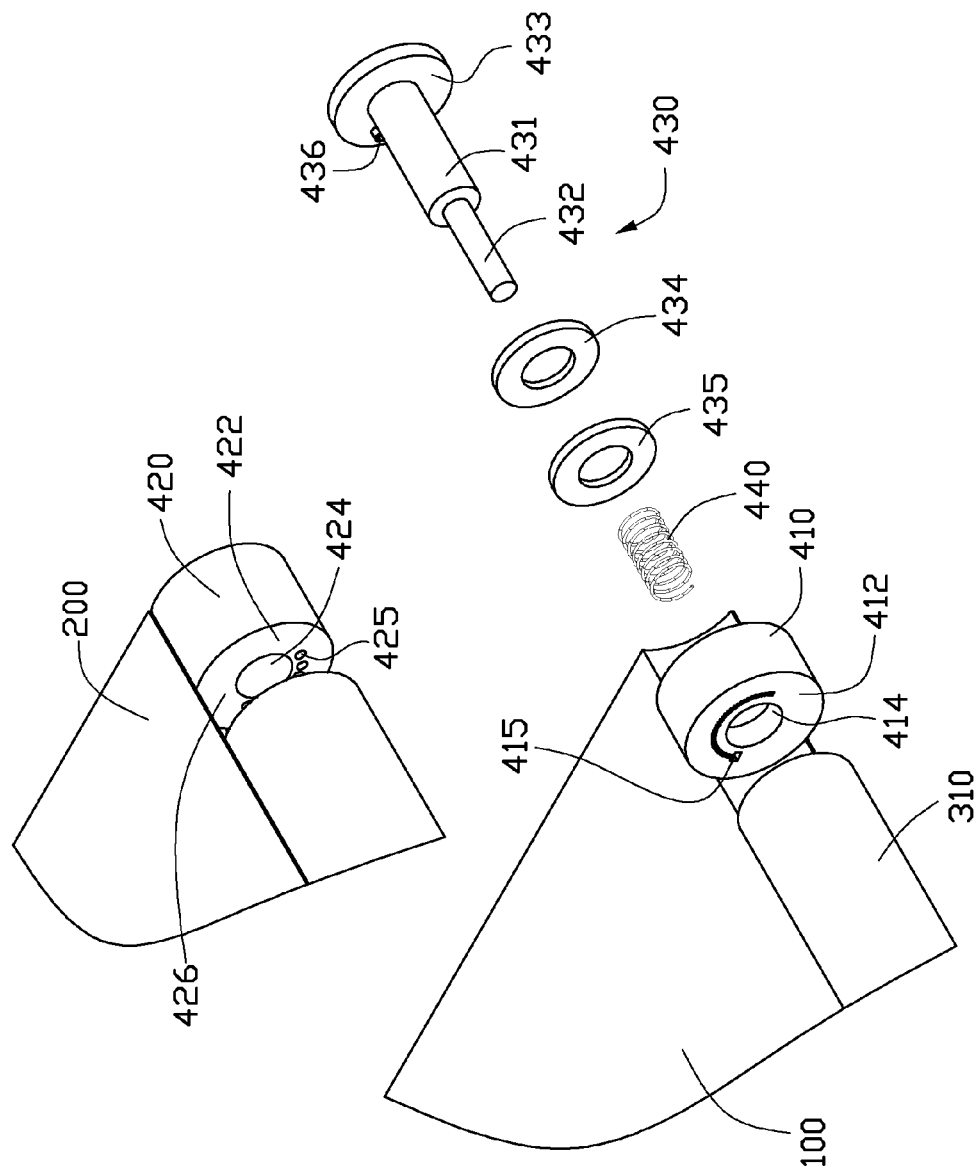
FIG. 2 is a partial, isometric, exploded view of the portable computing device of FIG. 1 viewed from another perspective.

The laptop computer 10 further includes a display positioning mechanism 400 that is used to set the display 200 in a desired position. The positioning mechanism 400 includes a first sleeve 420 fixed to the display 200, a second sleeve 410 fixed to the base 100, a button 430, and an elastic member 440. Referring to FIG. 2, the sleeve 410 is a hollow cylinder defining a space 413 (FIG. 1) and a second end wall 412 formed at an end thereof. The end wall 412 defines a second through bore 414 and a second positioning hole 415.

Similar to the sleeve 410, the sleeve 420 defines a space 423 (FIG. 1) and a first end wall 422. The end wall 422 defines a first through bore 424 and a plurality of first positioning holes 425. In the embodiment, the holes 425 are arranged in a circle around the bore 424. The sleeve 420 is spaced from the end of the axle receiver 320 to form a gap 426 to receive the sleeve 410. The sleeve 420 is aligned with the sleeve 410. The space 413 faces the end wall 422 and communicates with the space 423 through the bore 424.

The button 430 includes a larger rod 431 and a smaller rod 432. A head 433 is formed at one end of the larger rod 431 and extends radially outward from the lateral surface of the larger rod 431. The button 430 also includes a first annular plate 434 and a second annular plate 435 that are spaced from each other and extend radially outward from the lateral surface of the larger rod 431. In the embodiment, the first annular plate 434 and the second annular plate 435 are rings separately formed and can be connected to the larger rod 431 by glue.

Figure 3:
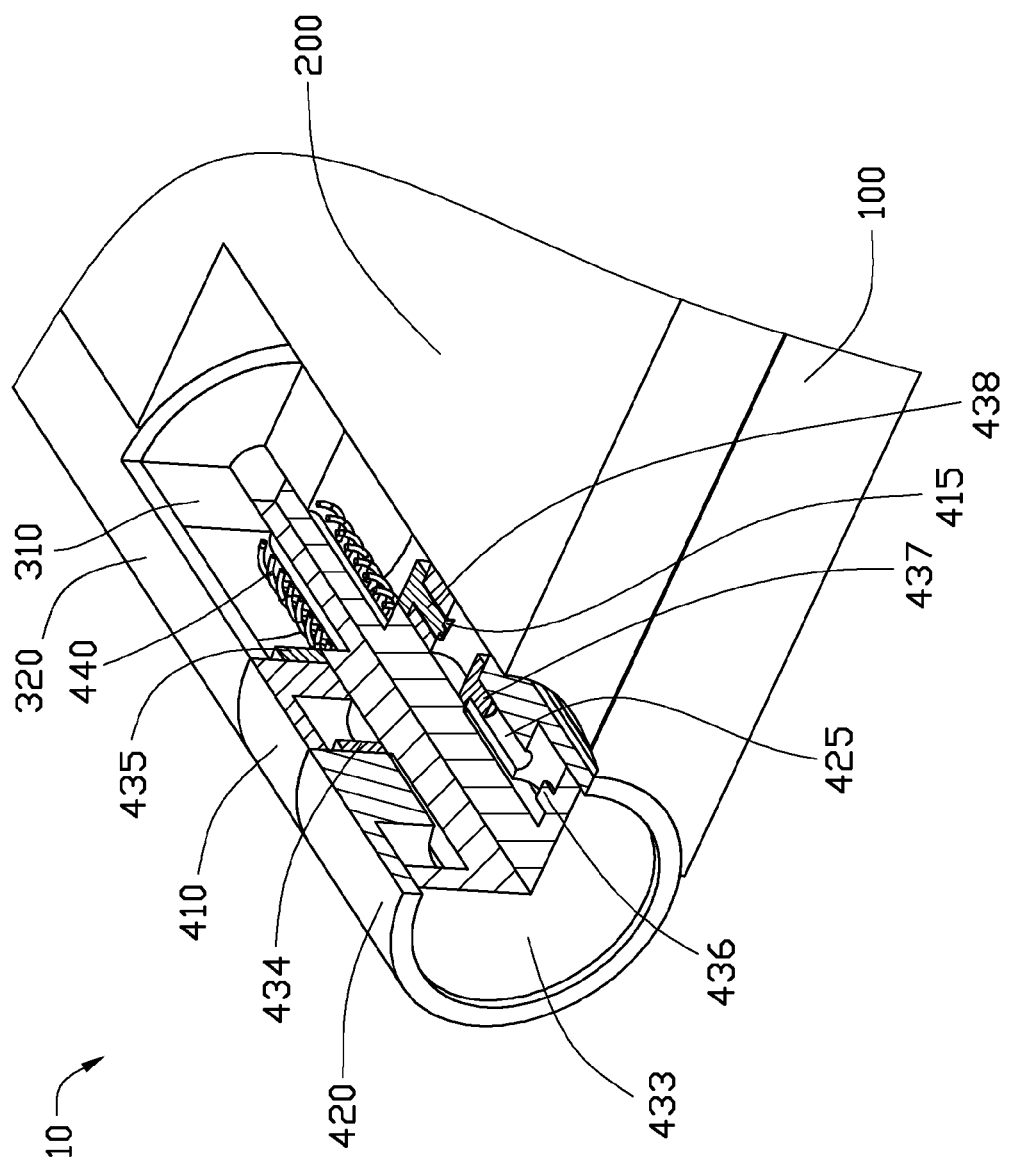
FIG. 3 is a cut-away view of the portable computing device of FIG. 1, showing that a display positioning mechanism stays in a first state.

Referring to FIG. 3, the first annular plate 434 includes a first protruding post 437. Similarly, the second annular plate 435 includes a second protruding post 438. The head 433 includes a third protruding post 436 extending toward the first annular plate 434. The protruding posts 437 and 438 extend toward the head 433. The protruding post 436 is aligned with the protruding post 437. The larger rod 431 and the smaller rod 432 extend through the through bores 424 and 414. The head 433 is movably received in the space 423. The first annular plate 434 is movably received in the space 413. The second annular plate 435 is movably received in the axle receiver 320.

The elastic member 440 is arranged between the second annular plate 435 and the axle 310 to apply a pushing force to the button 430. In the embodiment, the elastic member 440 is a coil spring with two ends resting against the second annular plate 435 and the end of the axle 310, respectively. The coil spring 440 is slightly compressed, which pushes the second annular plate 435 to abut against the end wall 412. The button 430 thus stays in a first, normal outermost position. The protruding post 437 is received in one of the positioning holes 425 of the end wall 422, and the protruding post 438 is received in the positioning hole 415. The sleeves 410 and 420 and the button 430 are thus connected together, which locks the display 200 to the base 100.

Figure 4:
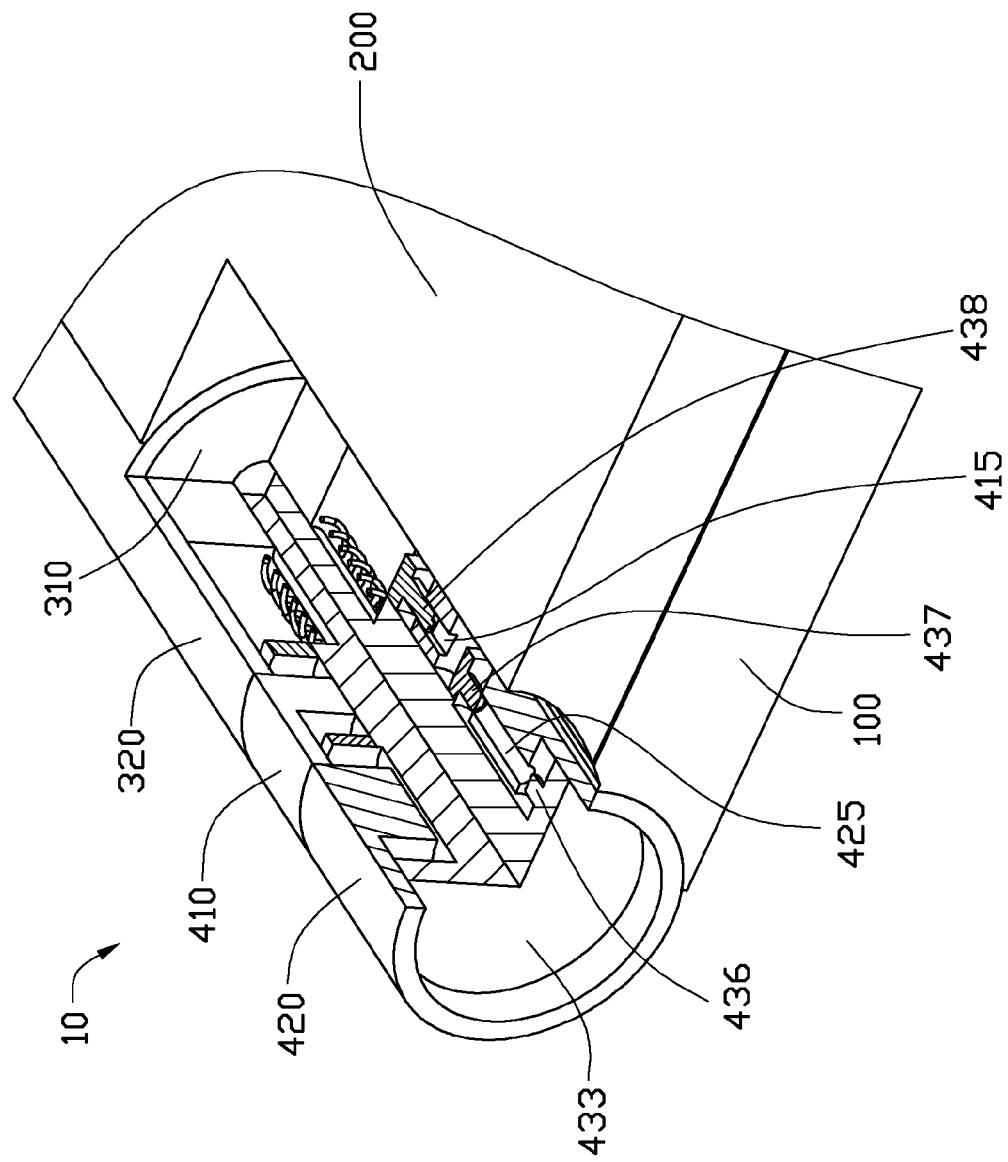
FIG. 4 is similar to FIG. 3, but showing that the display positioning mechanism stays in a second state.

Referring to FIG. 4, to rotate the display 200, the button 430 is pushed inward to a second, intermediate position where the protruding post 437 disengages from the positioning hole 425 and part of the protruding post 438 still remains in the positioning hole 415. The sleeve 420 is thus free from the limitation of the protruding post 437 and can rotate together with the display 200. After the display 200 has rotated to a desired position, the button 430 is then released, and slides back due to the spring force of the spring 440. After the protruding post 437 has been received in one of the positioning holes 425, the display 200 is locked in the desired position.

Figure 5:
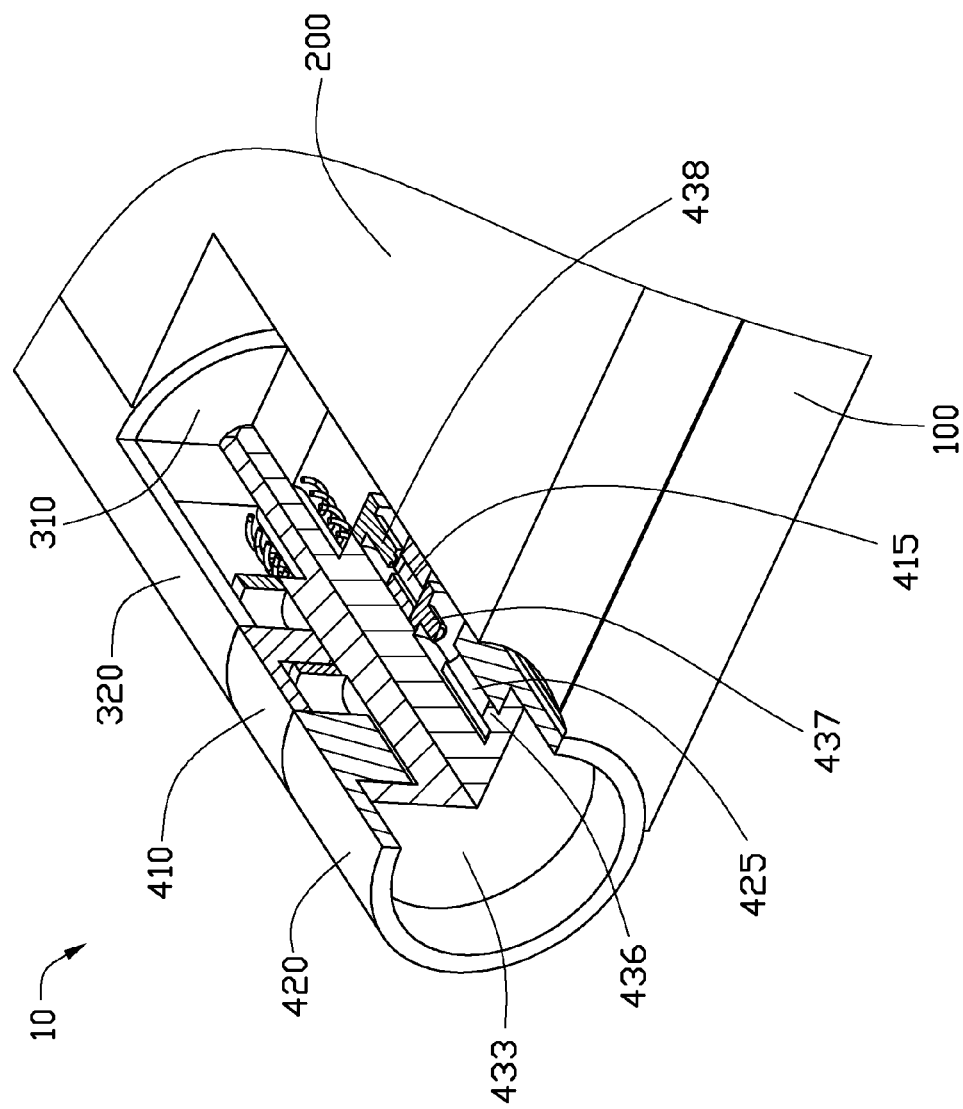
FIG. 5 is similar to FIG. 3, but showing that the display positioning mechanism stays in a third state.

Referring to FIG. 5, after the button 430 has been pushed to a third, innermost position, the protruding posts 437 and 438 both move out of the positioning holes 425 and 415 respectively, while the protruding post 436 is received in one of the positioning holes 425. The button 430 is thus free from the limitation of the protruding post 438 and can rotate together with the display 200. This allows the display positioning mechanism 400 to have a "memory effect". For example, in a condition when the computer 10 with the display 200 held opened needs to be transferred to another location, a user can push the button 430 to the innermost position and close the display 200. During the closing of the display 200, the end of the protruding post 438 abuts against the end wall 412, which prevents the button 430 from sliding back. While the display 200 is opened again, the end of the protruding post 438 moves against the end wall 412. After the display 200 rotates back to the previous position, the protruding post 438 aligns with the positioning hole 415 and slides into the positioning hole 415 due to the pushing from the coil spring 440. The protruding post 437 thus slides back into the previous positioning hole 425. As a result, the display 200 can return to the previous locked position.

While various embodiments have been described and illustrated, the disclosure is not to be constructed as being limited

What is claimed is:

1. A portable computing device comprising:
   a base;
   a display rotatably connected to the base; and
   a display positioning mechanism comprising:
   a first sleeve fixed to the display and comprising a first end wall defining a first through bore and a plurality of first positioning holes extending therethrough;
   a second sleeve fixed to the base and comprising a second end wall defining a second through bore and a second positioning hole; and
   a button slidably received in the first sleeve and the second sleeve and comprising a rod, a first annular plate, and a second annular plate, wherein, the rod extends through the first through bore and the second through bore, the first annular plate and the second annular plate are spaced from each other and extend radially outward from the rod, the first annular plate comprises a first post, the second annular plate comprises a second post; upon the condition that the button stays in a first position, the first post is received in one of the plurality of first positioning holes and the second post is received in the second positioning hole; upon the condition that the button is slid to a second position, the first post disengages from the one of the plurality of first positioning holes and part of the second post remains in the second positioning hole.

2. The portable computing device according to claim 1 further comprising a hinge to rotatably connect the display to the base, wherein the hinge comprises an axle fixed to the base.

3. The portable computing device according to claim 2, wherein the display positioning mechanism further comprises an elastic member arranged between the second annular plate and the axle to apply a pushing force to the second annular plate.

4. The portable computing device according to claim 3, wherein the elastic member is a coil spring.

5. The portable computing device according to claim 1, wherein the first annular plate and the second annular plate are fixed to the rod by glue.

6. The portable computing device according to claim 1, wherein the plurality of first positioning holes are arranged in a circle around the first through bore.

7. A portable computing device comprising:
   a base;
   a display rotatably connected to the base; and
   a display positioning mechanism comprising:
   a first sleeve fixed to the display and comprising a first end wall defining a first through bore and a plurality of first positioning holes extending therethrough;
   a second sleeve fixed to the base and comprising a second end wall defining a second through bore and a second positioning hole; and
   a button slidably received in the first sleeve and the second sleeve and comprising a rod, a head, a first annular plate, and a second annular plate, wherein, the rod extends through the first through bore and the second through bore, the head, the first annular plate and the second annular plate are spaced from each other and fixed on the rod, the first annular plate comprises a first post, the second annular plate comprises a second post, the head comprises a third post that is aligned with the first post, upon the condition that the button stays in a first position, the first post is received in one of the plurality of first positioning holes and the second post is received in the second positioning hole, upon the condition that the button is slid to a second position, the first post disengages from the one of the plurality of first positioning holes and the second post remains in the second positioning hole, upon the condition that the button is slid to a third position, the third post is received in one of the plurality of first positioning holes and the second post disengages from the second positioning hole.

8. The portable computing device according to claim 7 further comprising a hinge to rotatably connect the display to the base, wherein the hinge comprises an axle fixed to the base.

9. The portable computing device according to claim 8, wherein the display positioning mechanism further comprises an elastic member arranged between the second annular plate and the axle to apply a pushing force to the second annular plate.

10. The portable computing device according to claim 9, wherein the elastic member is a coil spring.

11. The portable computing device according to claim 7, wherein the head, the first annular plate, and the second annular plate are fixed to the rod by glue.

12. The portable computing device according to claim 7, wherein the plurality of first positioning holes are arranged in a circle around the first through bore.

13. A portable computing device comprising:
   a base;
   a display rotatably connected to the base; and
   a display positioning mechanism comprising:
   a first positioning member fixed to the display and comprising a first end wall defining a first through bore and a plurality of first positioning holes extending therethrough;
   a second positioning member fixed to the base and comprising a second end wall defining a second through bore and a second positioning hole;
   a button comprising a rod slidably and rotatably received in the first and second through bores, the button further comprising a head, and a first annular plate and a second annular plate fixed on the rod, wherein, the first annular plate and the second annular plate are spaced from each other by the second positioning member, the first annular plate comprises a first post, the second annular plate comprises a second post, the head comprises a third post that is facing and aligned with the first post; and
   an elastic member disposed between the second annular plate and the base, to push the second annular plate;
   wherein, upon the condition that the button stays in a first position, the first post is received in one of the plurality of first positioning holes and the second post is received in the second positioning hole, upon the condition that the button is slid to a second position, the first post disengages from the one of the plurality of first positioning holes and the second post partially remains in the second positioning hole, and upon the condition that the button is further slid to a third position, the third post is received in one of the plurality of first positioning holes and the second posts disengages from the second positioning hole.

* * * * *